(12) United States Patent
Pyett et al.

(10) Patent No.: US 10,858,052 B2
(45) Date of Patent: Dec. 8, 2020

(54) TURNTABLE TRAILER PIN CAPTURE DEVICE

(71) Applicants: SAVA IP PTY LTD ACN 614 328 497, Subiaco (AU); Karl Pyett, Perth (AU)

(72) Inventors: Karl Pyett, Perth (AU); Wayne Craig, Perth (AU)

(*) Notice: Subject to any disclaimer, the term of this patent is extended or adjusted under 35 U.S.C. 154(b) by 326 days.

(21) Appl. No.: 15/755,861

(22) PCT Filed: Aug. 30, 2016

(86) PCT No.: PCT/IB2016/055177
§ 371 (c)(1),
(2) Date: Feb. 27, 2018

(87) PCT Pub. No.: WO2017/037619
PCT Pub. Date: Mar. 9, 2017

(65) Prior Publication Data
US 2018/0334203 A1 Nov. 22, 2018

(30) Foreign Application Priority Data

Aug. 31, 2015 (AU) ................ 2015903542
Nov. 23, 2015 (AU) ................ 2015904812
Mar. 30, 2016 (AU) ................ 2016901159

(51) Int. Cl.
*B62D 53/10* (2006.01)
*H04W 4/12* (2009.01)

(52) U.S. Cl.
CPC ........... *B62D 53/10* (2013.01); *H04W 4/12* (2013.01)

(58) Field of Classification Search
CPC ..................................... B62D 53/10
See application file for complete search history.

(56) References Cited

U.S. PATENT DOCUMENTS

| 3,823,960 | A | 7/1974 | Boggs | |
|---|---|---|---|---|
| 3,892,426 | A * | 7/1975 | Ferris | B62D 53/10 280/432 |
| 6,491,317 | B1 | 12/2002 | Breese | |
| 6,547,270 | B1 * | 4/2003 | Breese | B62D 53/0828 280/432 |
| 6,695,337 | B1 * | 2/2004 | Breese | B60D 1/363 280/432 |

(Continued)

OTHER PUBLICATIONS

International Search Report for PCT/IB2016/055177 dated Oct. 25, 2016, 7 pages.

(Continued)

*Primary Examiner* — Tony H Winner
(74) *Attorney, Agent, or Firm* — Klintworth & Rozenblat IP LLP

(57) ABSTRACT

A device 401 for preventing a trailer pin from disengaging from a turntable, comprising: a base 402 configured for connection to a tow unit of the type that includes a turntable, and; a pin capture means 403 connected to the base 402, the base 402 and pin capture means 403 configured so that the pin capture means 403 can move between first and second positions relative to the base 402, and so that in the first position a trailer pin can freely slide in and out of the turntable, and in the second position the pin capture means 403 will prevent the trailer pin from rolling backwards off the turntable.

21 Claims, 14 Drawing Sheets

(56) References Cited

U.S. PATENT DOCUMENTS

| | | | |
|---|---|---|---|
| 7,100,935 B1* | 9/2006 | Dunbar | B62D 53/0828 280/432 |
| 7,654,553 B2* | 2/2010 | Shirk | B62D 53/0857 280/433 |
| 7,770,910 B1* | 8/2010 | Shirk, Jr. | B62D 53/10 280/433 |
| 8,668,221 B2* | 3/2014 | Adkins | B60D 1/02 280/510 |
| 2007/0257469 A1* | 11/2007 | Burns | B62D 53/0842 280/433 |
| 2009/0261559 A1 | 10/2009 | Bergeron | |

OTHER PUBLICATIONS

Written Opinion for PCT/IB2016/055177 dated Oct. 1, 2016, 12 pages.

* cited by examiner

TURNTABLE TRAILER PIN CAPTURE DEVICE

FIELD

The present invention relates to a device for preventing a trailer pin from disengaging from a towing vehicle turntable. More particularly, the present invention relates to a secondary or backup device for preventing a trailer pin from disengaging from a towing vehicle turntable or dolly turntable when the trailer is in motion.

BACKGROUND

A common type of vehicle freight transport is a semi-trailer and truck/tractor (prime mover) combination. The combination of truck/tractor (prime mover) and trailer is often called a semi-trailer truck or 'semi' in the US and Australia, and an articulated lorry or 'artic' in the UK.

The semi-trailer is typically hitched or connected to the rear of the truck/tractor for towing via a turntable located at the rear of the truck/tractor, a trailer pin that extends downwards from the front underside of the semi-trailer connecting with the turntable. As the semi-trailer has no front axle/wheel combination, the front end of the semi-trailer is supported by the truck/tractor.

In order to couple the trailer to the truck/tractor, the tractor unit backs up under the front end of the trailer, with the trailer pin sliding into the locking jaws of the turntable. After the pin has successfully locked into the turntable mechanism the driver does a 'tug test' before completing coupling the trailer to the truck/tractor—e.g. by connecting the air lines for operating the trailer brakes from the tractor unit, etc. On reaching their destination, the driver parks up, winds down the landing legs on the trailer so that the front end is self-supported, disengages the air lines, and disengages the trailer pin from the turntable so that the truck/tractor can be driven away, leaving the trailer behind.

If the turntable mechanism fails while the semi-trailer is in operation or moving (e.g. driving down the open highway), the trailer can disengage from the truck/tractor unit and roll backwards off the turntable. This can be extremely hazardous for other road users, as the trailer may block the road, causing vehicles to collide with the trailer, or the trailer have enough momentum to continue moving for some distance by itself, potentially colliding with other vehicles or leaving the road to strike buildings or similar. Even under low-speed conditions in an environment such as a transport yard, if the trailer disengages from the truck/tractor unit, this can drop the front end of the trailer onto the ground, which can damage the trailer and potentially ruin a load in the trailer, as it shifts during the drop. Even a low-speed impact can cause severe damage to a trailer. For example, a pan trailer (freezer box) can be damaged beyond repair even in a low-force/speed impact if, for example, the landing legs are driven up into the fibreglass structure of the trailer, delaminating the fibreglass box, compromising the structural integrity, and rendering it unusable.

SUMMARY OF THE INVENTION

It is an object of the present invention to provide a trailer pin capture device which goes some way to overcoming the above mentioned disadvantages, or which at least provides the public with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a device for preventing a trailer pin from disengaging from a turntable, comprising: a base, configured for connection to a tow unit of the type that includes a turntable, behind the turntable, and; a pin capture means connected to the base, the base and pin capture means configured so that the pin capture means can move between first and second positions relative to the base, and so that in the first position a trailer pin can freely slide in and out of the turntable, and in the second position the pin capture means will prevent the trailer pin from rolling backwards off the turntable.

Preferably the device for preventing a trailer pin from disengaging from a turntable further comprises a movement means operable to move the pin capture means between the first and second positions.

Preferably the pin capture means comprises a member shaped to engage with the trailer pin in the second position to prevent the pin from rolling backwards off the turntable.

Preferably the member comprises a plate having a recess formed on one edge.

Preferably the recess comprises an inner portion shaped to extend around the rear part of the trailer pin, adjacent to and in contact with the trailer pin, and an outer portion having a mouth wider than the trailer pin, the outer portion shaped to channel the trailer pin towards and into the inner portion.

Preferably the inner portion has a substantially semi-circular shape.

Preferably the plate is a substantially planar unitary steel plate.

Preferably the movement means comprises a hydraulic power pack.

Preferably the hydraulic power pack comprises a linearly moving cylinder that in use interacts with the pin capture means to move the pin capture means between the first and second positions.

Preferably the cylinder is connected to the pin capture means via an aperture in the pin capture means into which a free end of the cylinder locates.

Preferably the base comprises a pair of plates and a connection means, the plates arranged above and below a portion of the turntable to the rear of the turntable in use, the connection means configured to connect between the plates and move these towards one another so that the portion of the turntable is sandwiched between the plates with a pressure sufficient to retain the base in position.

Preferably the plates further comprise a plurality of apertures, the connection means comprising a plurality of nuts and bolts, the apertures configured to receive the bolts therethrough in use.

Preferably the pin capture means is located above the upper plate and moves upwards from the first position to the second position.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which:

FIG. 8a shows a side view of a mounting arm that is fitted to one side of the base plate, a pair of the arms fitted one to each side of the baseplate in use to form a mounting assembly or mounting base, each arm having an elongate front section with a central elongate slot, and a rear section adapted for connection to the base plate, the arm bent so that the front section is below the rear section in operation.

FIG. 8b shows a side view of the mounting arm of FIG. 8a.

DETAILED DESCRIPTION

The invention will be more clearly understood from the following description of some embodiments thereof, given by way of example only.

Figure 1:
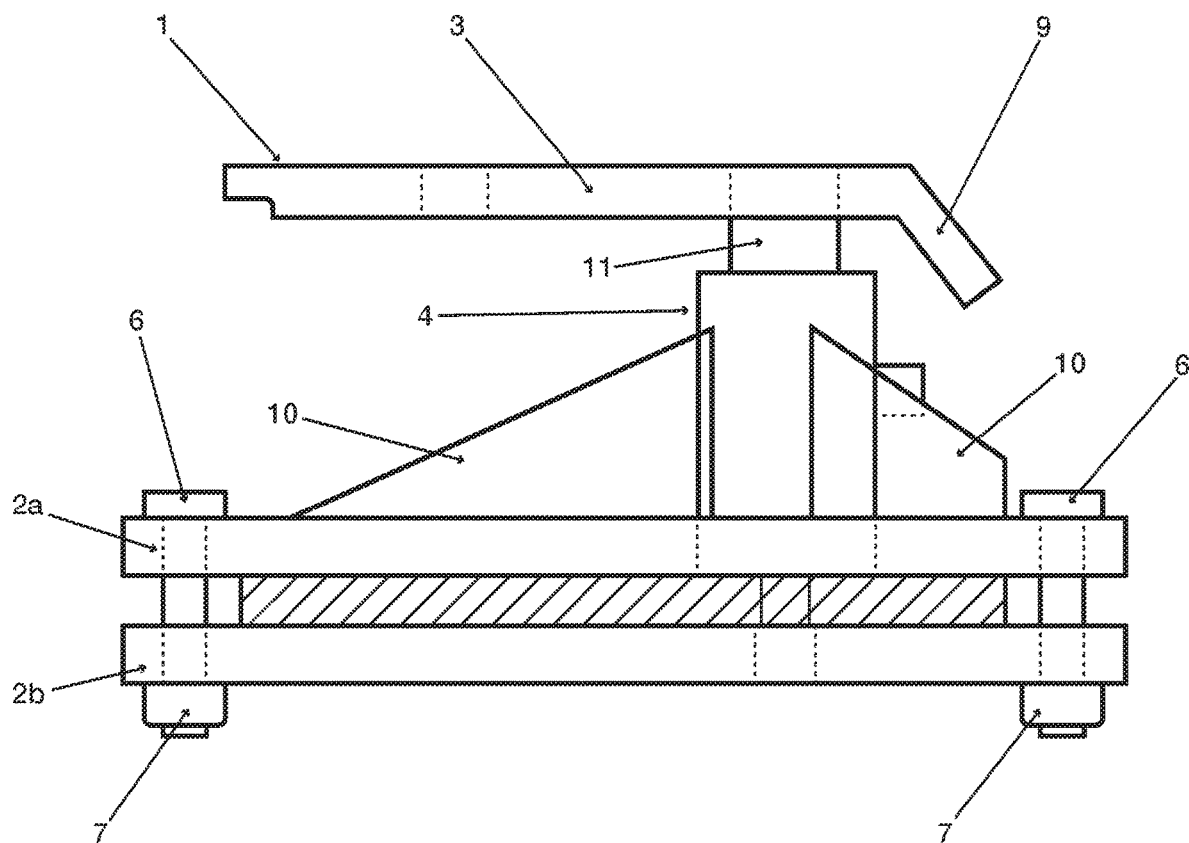
FIG. 1 shows a side view of an embodiment of the device for preventing a trailer pin from disengaging from a turntable of the present invention, the device having a base configured for connection to a tow unit of the type that includes a turntable, a pin capture plate connected to the base above the base, and a hydraulic cylinder that moves the plate from a first lower position close to the base and a second position further away or raised from the base, in the first position a trailer pin being able to freely slide in and out of a turntable without interference from the connected device, and in the second position the pin capture plate preventing the trailer pin from rolling backwards off the turntable.
Figure 2:
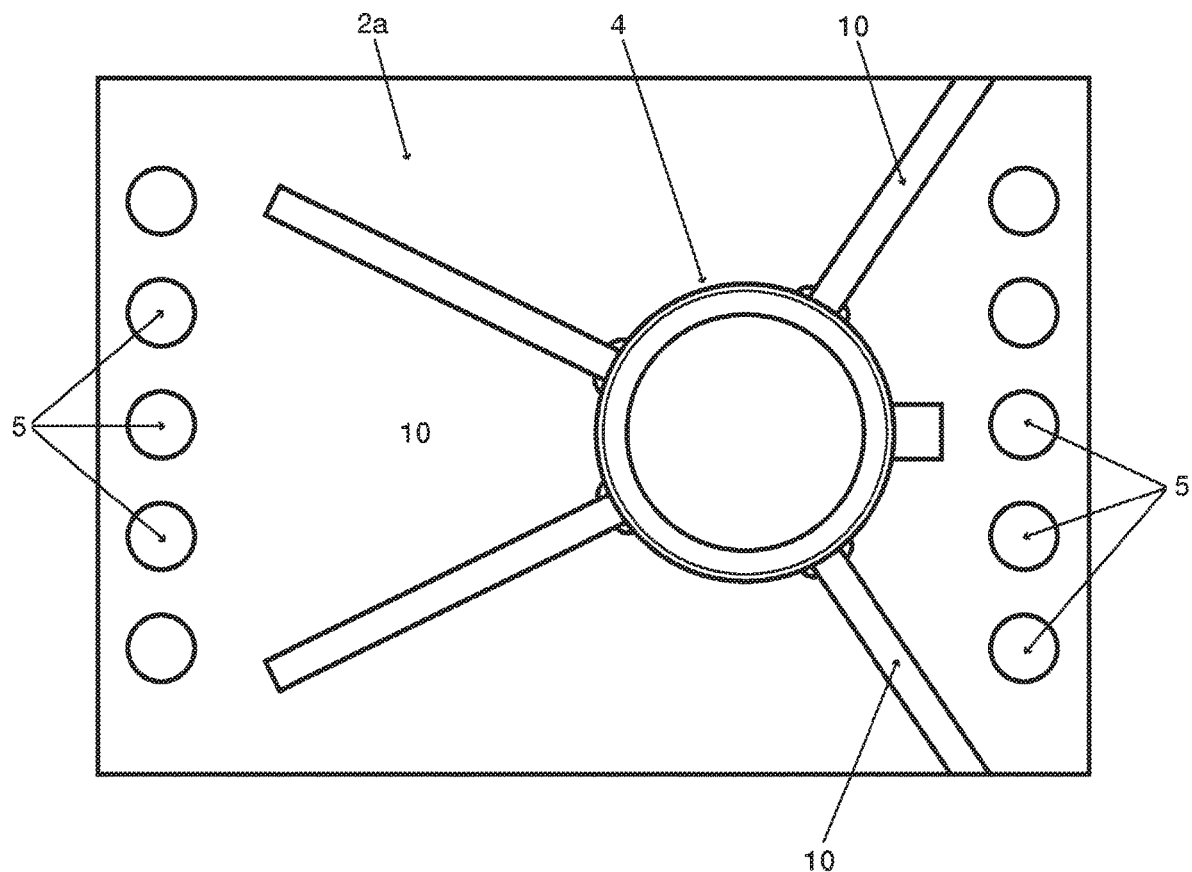
FIG. 2 shows a top or plan view of the device of FIG. 1, with the plate removed or not present.
Figure 3:
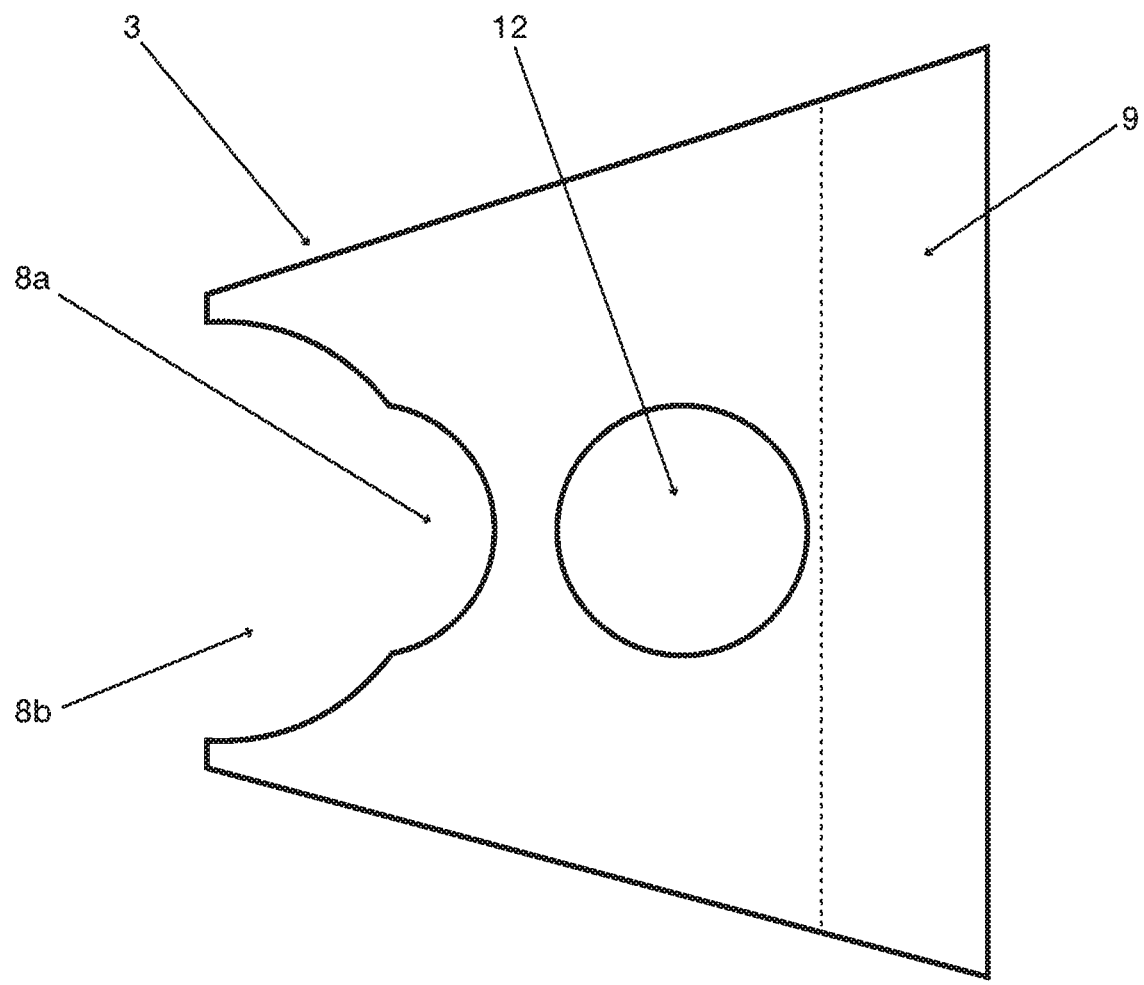
FIG. 3 shows a plan view of the capture plate of FIG. 1, showing detail of a recess into which the pin will travel in use if the trailer becomes inadvertently detached from the tow unit, and an aperture by which the hydraulic cylinder piston is connected to the plate.

A first embodiment of the device for preventing a trailer pin from disengaging from a turntable is shown in FIGS. 1 to 3. The device 1 has three main parts: a base 2, a capture plate 3, and a hydraulic cylinder 4.

The base 2 has two main purposes: firstly, it is used to connect the device 1 to a tow unit, and secondly it acts a base platform for the capture plate 3 and hydraulic cylinder 4. The device 1 is intended for use with tow units of the type that have an integral turntable, for example the widely-used 'fifth wheel' coupler. However, in the specification where reference is made to a 'tow unit', 'tow vehicle', or similar, this should be taken as meaning a truck, tractor or other powered prime mover, or the lead AB combination trailer, or a dolly, or any other towing device that uses a turntable.

In this embodiment, the base 2 comprises two plates: an upper plate 2a and a lower plate 2b. A number of apertures 5 are formed through the plates 2a and 2b, the position of the apertures 5 on the lower plate 2b corresponding to those on the upper plate 2a. A number of bolts 6 are passed through the apertures 5 in use, and secured in position by nuts 7. In use, a rear section of the turntable on the tow unit is sandwiched between the upper and lower plates 2a, 2b, and these are tightened onto the sandwiched section by tightening the nuts and bolts 6, 7, with pressure sufficient to retain the base in position. In this manner the device 1 is attached in position on the tow unit or tow vehicle without requiring any modification of the tow vehicle that might affect the structural integrity (e.g. cutting or drilling in order to effect attachment).

The capture plate 3 is a generally planar steel plate, having the general form of a triangle with the top cut off. The wider base is towards the rear (i.e. facing away from the tow unit). A recess 8 is formed in the narrower end. The recess 8 has an inner portion 8a and an outer portion 8b.

In plan view the inner portion has the form of a semi-circular cut-out. The diameter of the semi-circular cut-out inner portion 8a is substantially the same as a trailer kingpin (e.g. the 2-or-3 and 3.5-inch (50.8 or 77 mm 88.9 mm)) diameter steel pin that extends downwards from the underside at the front end of a semi-trailer) so that the perimeter of the inner portion 8a can contact and extend around the rear part of the circumference of the trailer pin, adjacent to and in contact with the trailer pin.

The outer portion has a mouth that opens at the front edge of the capture plate 3 (the cut-off top of the triangle). The mouth is wider than the trailer pin, and the outer portion is shaped to funnel or channel the trailer pin towards and into the inner portion. In this embodiment, this is achieved by having the outer portion 8b formed as a semi-circle of wider diameter than, and overlapping with, the inner portion 8a, as shown in FIG. 3.

The rear of the plate 3 is angled downwards, or forms a downwardly-angled lip 9.

The hydraulic cylinder 4 forms a movement mechanism between the base 2 and the plate 3. The lower end of the outer sheath of the hydraulic cylinder 4 is connected to and extends upwards from the upper plate 2a. A number of buttress elements 10 connect between the plate 2a and the outer sheath to brace the cylinder 4 and hold it in position. The inner piston 11 can move upwards and downwards relative to the sheath and upper plate 2a.

The capture plate 3 has a connection aperture 12, located just behind the recess 8. The upper end of the piston 11 locates into this to connect the plate 3 and the hydraulic cylinder 4. As the piston 11 moves up and down, the connected plate 3 moves up and down between a first lower position and a second upper position.

In use, the device 1 is clamped to the turntable of the tow unit behind the mouth of the turntable. An operator manoeuvres the tow unit so that the kingpin slides into the turntable via the mouth. During this operation, the device 1 is operated such that the piston 11 is in the lower or first position so that the turntable and kingpin can connect without interference.

Once the kingpin is located in the turntable, the operator activates the device 1 to move the piston 11 to the second or upper position, the plate 3 rising with the piston 11 (this could also be done automatically as the rear brake line couplings are connected). The hydraulic cylinder 4 is operated via a hydraulic power pack or via a PTO means from the tractor units gearbox). The recess 8 is now directly behind the body of the kingpin. If during use the turntable jaws fail and open, the pin will slide rearwards out of the turntable. However, the trailer will be prevented from detaching from the tow unit as the pin will slide into the recess 8. With the plate 3 connected to the base 2, which is connected to the towing unit, the trailer will thus be prevented from moving further rearwards and fully detaching or rolling backwards off the turntable. That is, the recess 8 is shaped so that in the second position if the trailer pin slides rearwards, the recess 8 will engage with the trailer pin to prevent the pin from rolling backwards off the turntable.

When the operator wishes to disengage the trailer from the towing unit, they disengage the hydraulic cylinder 4, and the piston returns to the first, lower position, allowing the towing unit to be driven clear of the trailer, the kingpin passing over the top of the plate 3.

Figure 4:
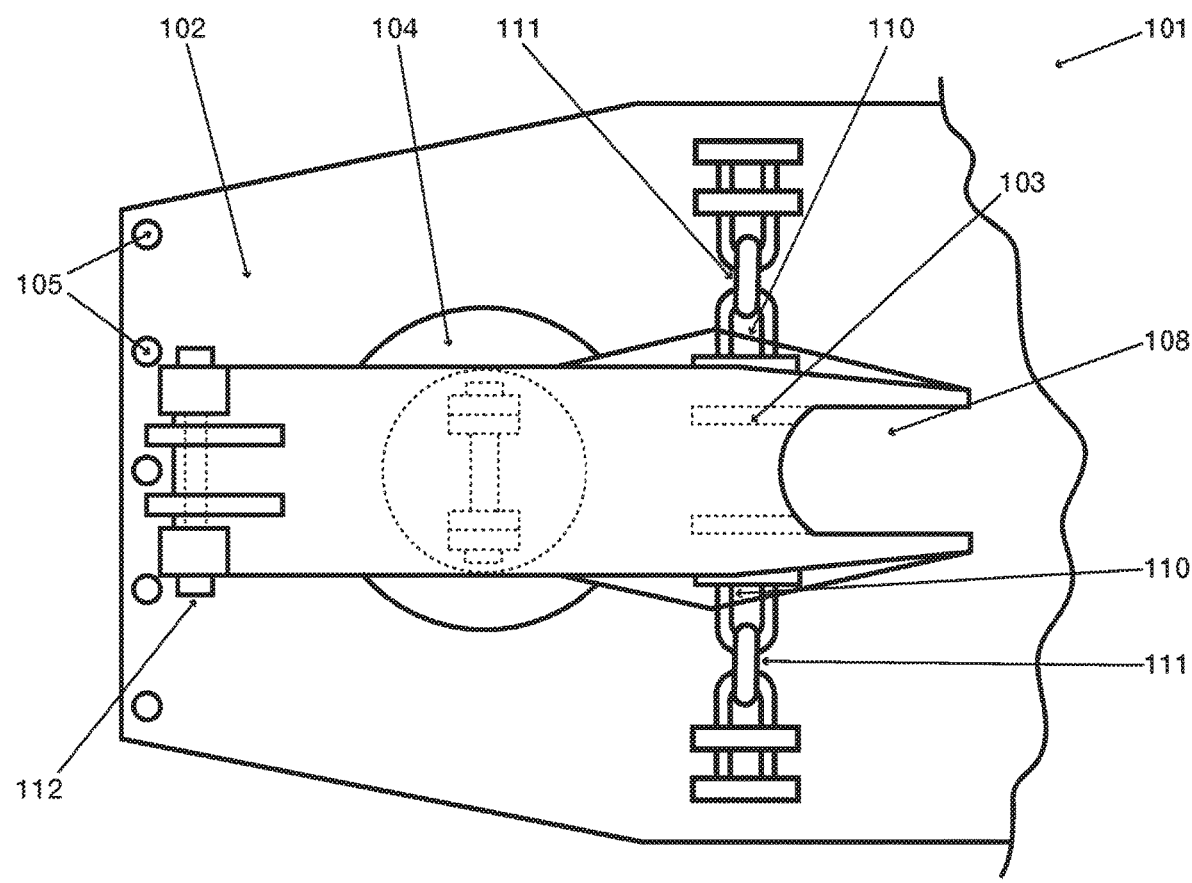
FIG. 4 shows a top or plan view of a second embodiment of the device for preventing a trailer pin from disengaging from a turntable of the present invention, the device of the second embodiment having a base configured for connection to a tow unit of the type that includes a turntable, a pin capture arm connected to the base above the base, and an air bag arranged to move the pin capture arm from a first lower position close to the base and a second position further away or raised from the base, in the first position a trailer pin being able to freely slide in and out of a turntable without interference from the connected device, and in the second position the pin capture plate preventing the trailer pin from rolling backwards off the turntable.
Figure 5:
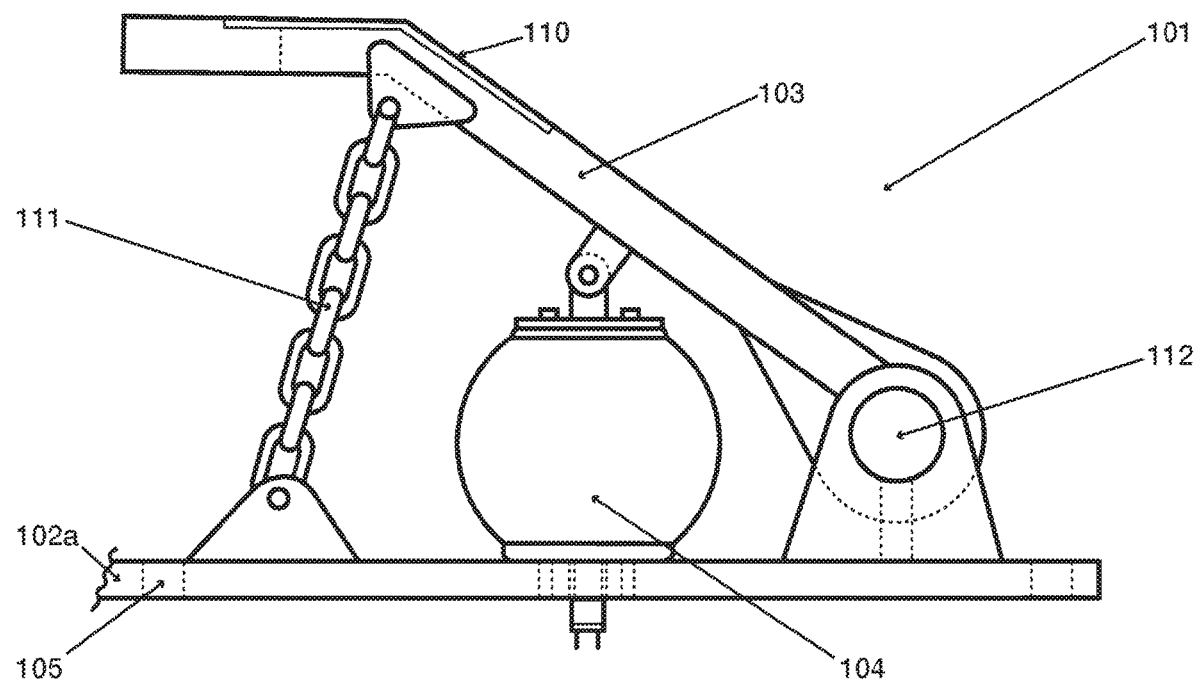
FIG. 5 shows a side view of the device shown in FIG. 4, showing detail of the connection arrangement between the air bag and the pin capture arm, the pin capture arm shown raised or pivoted away from the base in the second position, the figure also showing chains that connect between the base and the arm and which allow movement or pivoting of the arm over a certain set range before further movement of the arm away from the base is prevented by the chains becoming taut.
Figure 6:
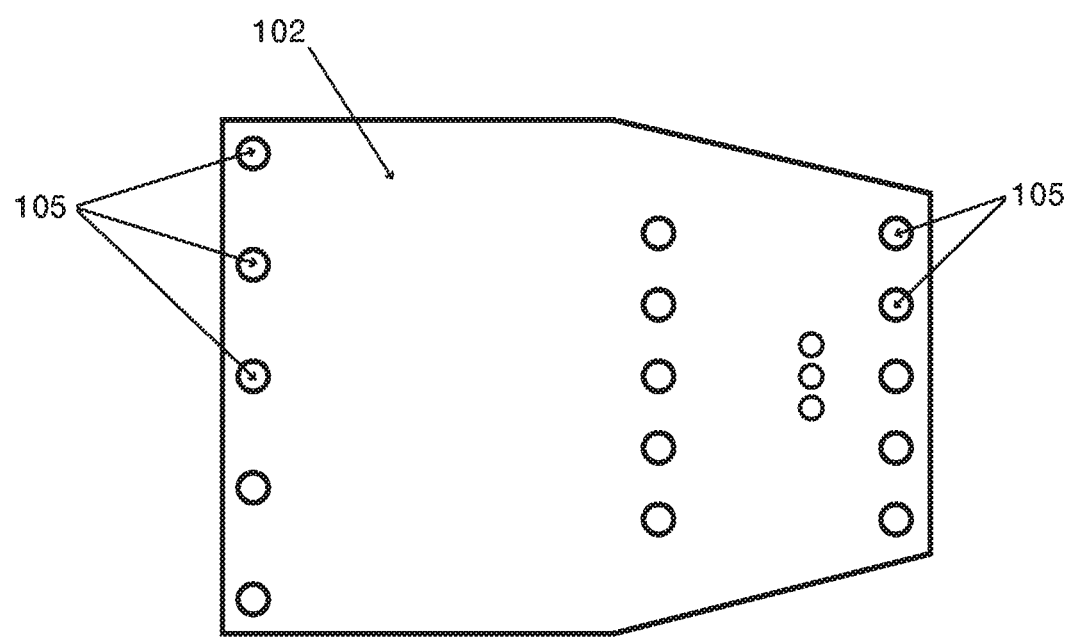
FIG. 6 shows a plan view of one of the plates that forms the base of the device of the second embodiment, the base formed from two substantially identical plates.

A second embodiment of the device for preventing a trailer pin from disengaging from a turntable is shown in FIGS. 4 to 6. The device 101 has three main parts: a base 102, a capture plate 103, and an air bag 104.

The base 102 has two main purposes: firstly, it is used to connect the device 101 to a tow unit, and secondly it acts a base platform for the capture plate 103 and air bag 104. The device 101 is intended for use with tow units of the type that have an integral turntable, for example the widely-used 'fifth wheel' coupler. However, in the specification where reference is made to a 'tow unit', 'tow vehicle', or similar, this should be taken as meaning a truck, tractor or other powered prime mover, or the lead AB combination trailer, or a dolly, or any other towing device that uses a turntable.

In this embodiment, the base 102 comprises two plates: an upper plate 102a and a lower plate (not shown, but substantially identical to the upper plate 102a). A number of apertures 105 are formed through the upper plate 102a, with corresponding apertures formed through the lower plate, so that the position of the apertures 5 on the lower plate corresponds to those on the upper plate 102a. A number of bolts are passed through the apertures 5 in use, and secured in position by nuts. In use, a rear section of the turntable on the tow unit is sandwiched between the upper and lower plates, and the plates are tightened onto the sandwiched section by tightening the nuts and bolts that pass through the plates with pressure sufficient to retain the base in position. In this manner the device 101 is attached in position on the tow unit or tow vehicle without requiring any modification of the tow vehicle that might affect the structural integrity (e.g. cutting or drilling in order to effect attachment).

In this embodiment, the capture arm 103 has the form of an angled elongate member. When viewed from the side, the capture arm 103 has an elongate body with generally straight first and second parts, aligned at an angle to one another. The outer or rear end of the first part is pivotally connected to the upper surface of the upper plate 102a to form a pivot axis 112, generally aligned in parallel with the upper surface of the upper plate 102a, the arm 103 rotating around this axis. The second part extends from the inner or front end of the first part, so that when the first part is angled upwards from the plate 102a at around 20 degrees, the second part is parallel to the upper surface of the upper plate 102a. As the arm 103 rotates around the pivot axis, the front end of the arm 103 rotate downwards towards and upwards away from the upper plate 102a.

As shown in FIG. 4, the outer or open end of the second part of the arm 103 has a recess or slot 108 formed in it, having generally straight sides and a curved inner base end when viewed in plan view. The width of the slot 108 is substantially the same as a trailer kingpin (e.g. the 102-or-103 and 103.5-inch (50.8 or 77 mm 88.9 mm) diameter steel pin that extends downwards from the underside at the front end of a semi-trailer) so that a trailer pin will fit closely inside the slot 108. The slot is sized to fit a specific diameter of pin. However, different sizes of arm can be manufactured for use with the different sizes of pin used in different types of trailers. In use, the pin slides into the open outer or front end of the slot 108. The base 102 is connected to the tow unit so that the slot 108 is directly behind the opening of the jaws of the turntable.

The arm 103 is only slightly wider along most of its length than the pin with which it is used. However, a pair of wings 110 are formed to extend outwards from each side of the arm from the open mouth of slot 108, angled or flaring outwards from the mouth when viewed in plan view and extending a short distance past the angled elbow where the first and second parts join before angling to merge back with the arm. The wings 110 are aligned to generally extend parallel to the top surface of the first part, and the second part (they are angled at the elbow so that they follow the planes of the top surfaces of the first and second parts of the arm 103). In use, as the kingpin feeds into the turntable, the wings 110 help to prevent the kingpin from getting stuck between the capture device and the wedge of the turntable.

A pair of chains 111 are connected between the arm 103 and the plate 102a. These extend one from each side of the elbow of the arm 103 to the upper surface of the plate 102a. and prevent the arm 103 rotating upwards past the position where the second part is parallel to the upper surface of the plate 102a. In operation, strong cable ties can also be used to set the height in conjunction with the chain. These can be useful if slightly less upwards rotation of the arm 103 is desired (slightly less than would be provided by the chains by themselves, which are a set length and therefore offer set height/rotation).

In this embodiment, the air bag 104 forms a movement mechanism between the base 102 and the arm 103. The air bag 104 is formed from a robust flexible material such as thick rubber or similar, and is located between the underside of the first part of the arm 103 and the upper surface of the plate 102a, and is connected to the arm 103 by any suitable connection mechanism so that as the air bag is inflated and deflated, the arm 103 will rotate upwards and downwards around the pivot axis 112. The air bag 104 is fluidically connected to or plumbed into the supply tank of the truck or prime mover so that it is powered independently of any other systems and runs solely on air from the supply of the truck. Once the truck has built up its air pressure the system will automatically inflate the air bag 104 to the pre-set required pressure, which in this embodiment is 20 PSI (in this embodiment, this pressure is lower than the full capacity of the air bag 104). This pressure corresponds to a pre-set required height of the turntable in relation to the chassis, so that the air bag 104 is not lifting a connected trailer. The height of the turntable in relation to the chassis is set at the fitting stage—i.e. when the device 101 is fitted to the tow unit (or manufactured as an integral part of the tow unit). The air bag 104 is shown inflated to the operation position in FIG. 5, with the arm 103 lifted/pivoted upwards away from the upper plate 102a.

In use, the device 101 is clamped to the turntable of the tow unit behind the mouth of the turntable. An operator manoeuvres the tow unit so that the kingpin slides into the turntable via the mouth. During this operation, the air bag 104 is deflated so that the arm 103 is rotated downwards towards the plate 102a in a first or lowered position, so that the turntable and kingpin can connect without interference. The kingpin is moved into position in the jaws of the turntable, the kingpin moving over the top of the lowered arm 103 in the first position.

Once the kingpin is located in the turntable, the operator activates the device 101 to inflate the air bag 104 to move the arm 103 to the second or upper position.

The arm of the device 101 is now sitting between the jaws of the turntable, directly behind the kingpin. In normal use, the arm rides up and down on the air bag depending on the trailers position to the prime movers at any given time. The slot or recess 108 is now directly behind the body of the kingpin. If during use the turntable jaws fail and open, the pin will slide rearwards out of the turntable but the trailer will be prevented from detaching from the tow unit as the pin will slide into the slot 108. With the plate 103 connected to the base 102, which is connected to the towing unit, the trailer will thus be prevented from moving further rearwards and fully detaching or rolling backwards off the turntable. That is, the slot 108 is shaped so that in the second position if the trailer pin slides rearwards, the recess 108 will engage with the trailer pin to prevent the pin from rolling backwards off the turntable.

When the driver wishes to release the capture device they can do so by way of the spring return detent air valve, which when operated dumps the air from the air bag allowing the arm 103 to rotate downwards towards the plate 102a from the second position to the first position. The trailer can then be removed from the turntable in the normal manner.

The length of the slot 108 allows full capture of the pin (i.e. the slot is at least as long as the diameter of the pin). This allows control to be maintained, so the driver of the tow unit can gently apply the brakes of the prime mover so the trailer is allowed to move forward and subsequently be locked back into the turntable, so control can be maintained.

Another advantage of the second embodiment is during operations which may cause the angle between the tow unit and the trailer to become exceptionally large. Certain operations can cause the turntable to travelling in an upwardly angled position. An example operation would be when the unit is used in a quarry or similar, and the trailing trailer is getting pushed up a steep bank. The combination of the chain and airbag allows the operator to manoeuvre the unit to achieve maximum permissible travel allowances. In particular, if the chain is held short by the cable ties or a similar safety device, when these snap or give, this releases the remaining small portion of the chain to allow an additional small range of movement. Given on average the prime movers turntables move only 12 degrees up or down this is an added safety feature.

Figure 7:
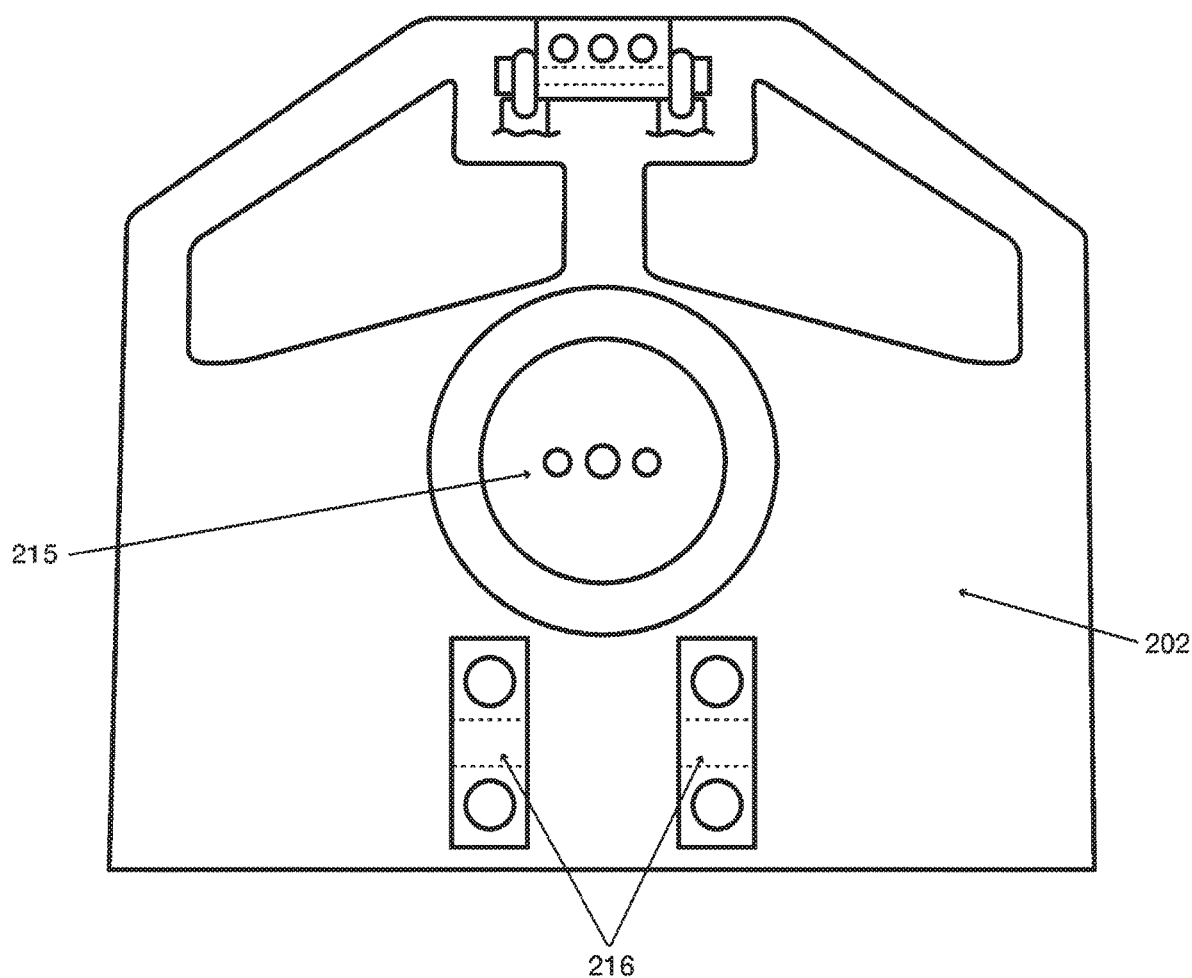
FIG. 7 shows a plan view of a base plate, for use as part of a third embodiment of a device for preventing a trailer pin from disengaging from a turntable, the base plate having a central portion to which an air bag can be fitted, a front section to which chains can be attached, and arm mounting points at the rear to which an arm can be pivotally mounted.
Figures 8A, 8B:
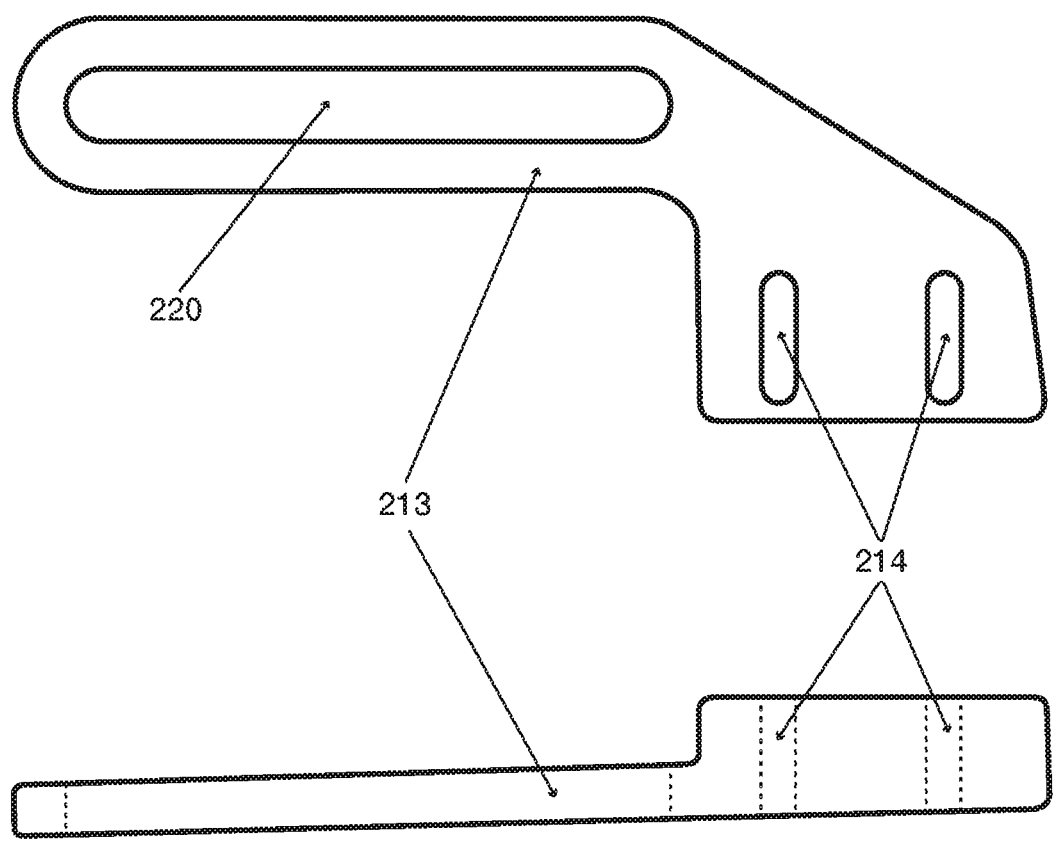
Figure 9:
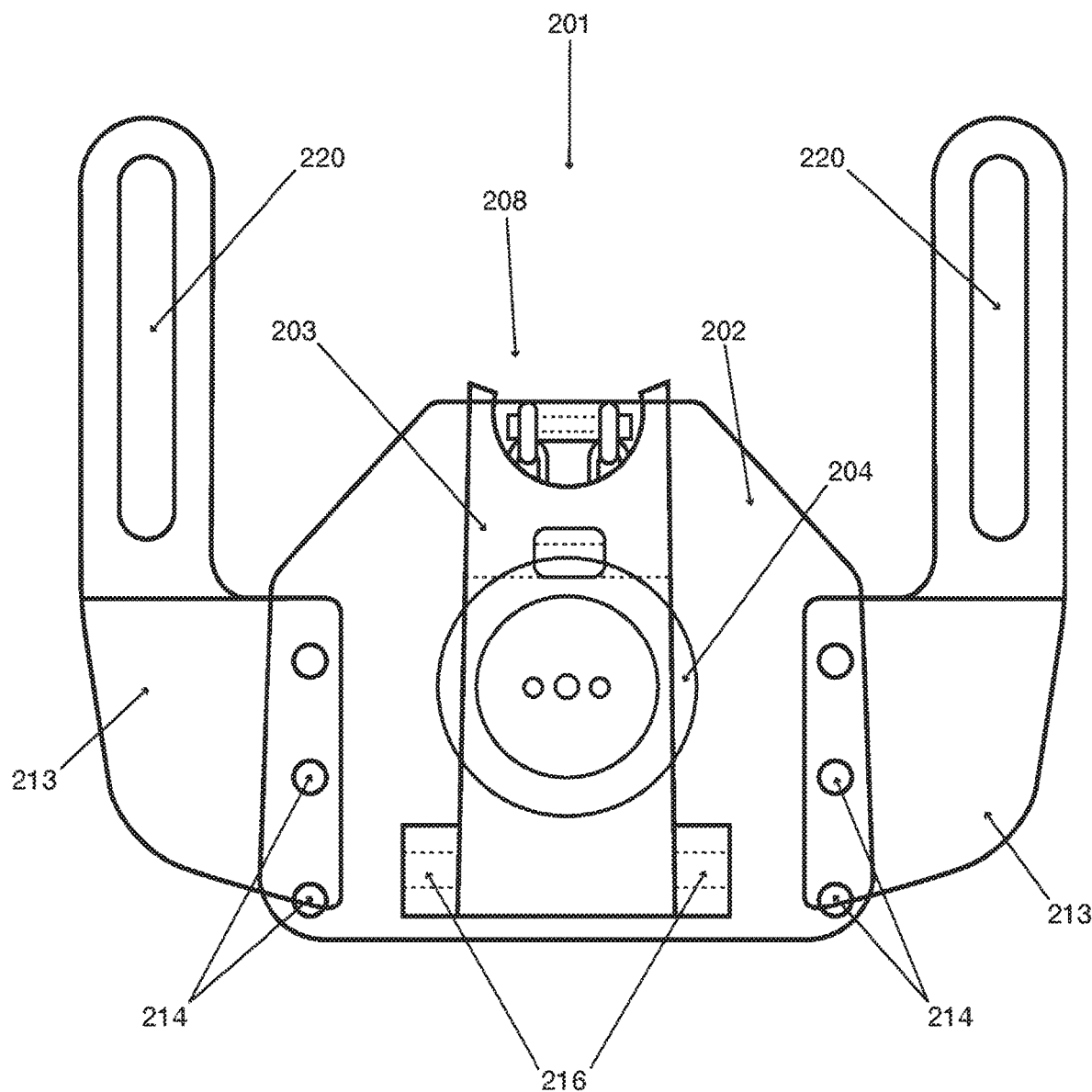
FIG. 9 shows a top or plan view of the third embodiment of a device for preventing a trailer pin from disengaging from a turntable, with a pair of the arms of FIGS. 8a and 8b mounted one to each side of a base plate as shown in FIG. 7, a capture arm mounted on the plate with the rear end of the capture arm connected to the plate at the arm mounting points, chains connecting to the front of the arm, and an air bag mounted to the plate under the capture arm.

A third embodiment or variation of the device for preventing a trailer pin from disengaging from a turntable is shown in FIGS. 7 to 9. This variation is primarily intended for use with units that transport fuel or other hazardous materials, and is intended to remove the possibility of sparking or similar hazards.

The device 201 has four main parts: a base or bottom plate 202, mounting arms 213, a capture arm 203, and an air bag 204.

The mounting arms 213 are shaped as generally shown in FIGS. 8a and 8b—that is, as elongate unitary members having a front end formed as an elongate extension, with a central elongate slot 220 running generally along the front-rear axis of the extension, and an inwardly-angled rear portion which is used to connect the arms 213 to the base plate 202. The rear portion of the mounting arms 213 is raised above the front portion by bending of the unitary member, with the rear and front portions generally aligned parallel to one another in side view. In use, the mounting arms 213 are connected one to each side of the base plate 202, via apertures and slots 214 in the rear portion of each of the arms 213 and along the sides of the base plate 202, towards the rear of the base plate 202.

The base plate 202 is shown in FIG. 7, and has a central section 215 on which the air bag is mounted, and mounting points 216 at the rear for pivotally mounting the capture arm 203.

In this variation, the base plate 202, the capture arm 203 and the mounting arms 213 are formed from aluminium. This is to prevent or reduce the likelihood of sparks or similar which could cause ignition if a hazardous or flammable load is being towed.

The capture arm 203 and air bag 204 are substantially formed as described above for the second variation or embodiment (although as indicated the capture arm in this embodiment is specifically formed from a non-sparking material such as aluminium), and these items operate in a similar manner (i.e. the air bag forms a movement mechanism, inflating and deflating to move the arm 203 up and down by pivoting around the pivot axis 212 where the capture arm 203 is connected to the plate 202, with upwards movement of the capture arm 203 constrained by the chains 211).

The device 201 is connected to a tow unit via the mounting arms 214. As for the previous embodiments, the device 201 is intended for use with tow units of the type that have an integral turntable, for example the widely-used 'fifth wheel' coupler. However, in the specification where reference is made to a 'tow unit', 'tow vehicle', or similar, this should be taken as meaning a truck, tractor or other powered prime mover, or the lead AB combination trailer, or a dolly, or any other towing device that uses a turntable. The mounting arms 214 are shown connected to each side of the base plate 202 in FIG. 9.

In use, the device 201 is clamped to the turntable of the tow unit behind the mouth of the turntable, via the slots 220 in the arms 213. An operator manoeuvres the tow unit so that the kingpin slides into the turntable via the mouth. During this operation, the air bag 204 is deflated so that the capture arm 203 is rotated downwards towards the plate 202 in a first or lowered position, so that the turntable and kingpin can connect without interference. The kingpin is moved into position in the jaws of the turntable, the kingpin moving over the top of the lowered arm 203 in the first position.

Once the kingpin is located in the turntable, the operator activates the device 201 to inflate the air bag 204 to move the capture arm 203 to the second or upper position.

In a similar fashion to that previously described, the air bag 204 is fluidically connected to or plumbed into the supply tank of the truck or prime mover so that it is powered independently of any other systems and runs solely on air from the supply of the truck. Once the truck has built up its air pressure the system will automatically inflate the air bag 204 to the pre-set required pressure, which in this embodiment is 20 PSI (in this embodiment, this pressure is lower than the full capacity of the air bag 204). This pressure corresponds to a pre-set required height of the turntable in relation to the chassis, so that the air bag 204 is not lifting a connected trailer. The height of the turntable in relation to the chassis is set at the fitting stage—i.e. when the device 201 is fitted to the tow unit (or manufactured as an integral part of the tow unit).

The capture arm 203 is now sitting between the jaws of the turntable, directly behind the kingpin. In normal use, the capture arm 203 rides up and down on the air bag depending on the trailers position to the prime movers at any given time. The front slot or recess 208 of the capture arm 203 is now directly behind the body of the kingpin. If during use the turntable jaws fail and open, the pin will slide rearwards out of the turntable but the trailer will be prevented from detaching from the tow unit as the pin will slide into the slot 208. With the plate 203 connected to the base 202, which is connected to the towing unit, the trailer will thus be prevented from moving further rearwards and fully detaching or rolling backwards off the turntable. That is, the slot 208 is shaped so that in the second position if the trailer pin slides rearwards, the recess 208 will engage with the trailer pin to prevent the pin from rolling backwards off the turntable.

When the driver wishes to release the capture device they can do so by way of the spring return detent air valve, which when operated dumps the air from the air bag allowing the arm 203 to rotate downwards towards the plate 202 from the second position to the first position. The trailer can then be removed from the turntable in the normal manner.

A fourth embodiment or variation of the device for preventing a trailer pin from disengaging from a turntable is shown in FIGS. 11 to 16.

The device 301 has four main parts: a mounting base or bottom plate 302, a capture arm 303, and a piston 304.

The mounting base 302 has two main purposes: firstly, it is used to connect the device 301 to a tow unit, and secondly it acts a base and mounting platform for the capture arm 303 and piston 304. The device 301 is intended for use with tow units of the type that have an integral turntable, for example the widely-used 'fifth wheel' coupler, such as is shown for example in FIG. 10. However, in the specification where reference is made to a 'tow unit', 'tow vehicle', or similar, this should be taken as meaning a truck, tractor or other powered prime mover, or the lead AB combination trailer, or a dolly, or any other towing device that uses a turntable.

Figure 10:
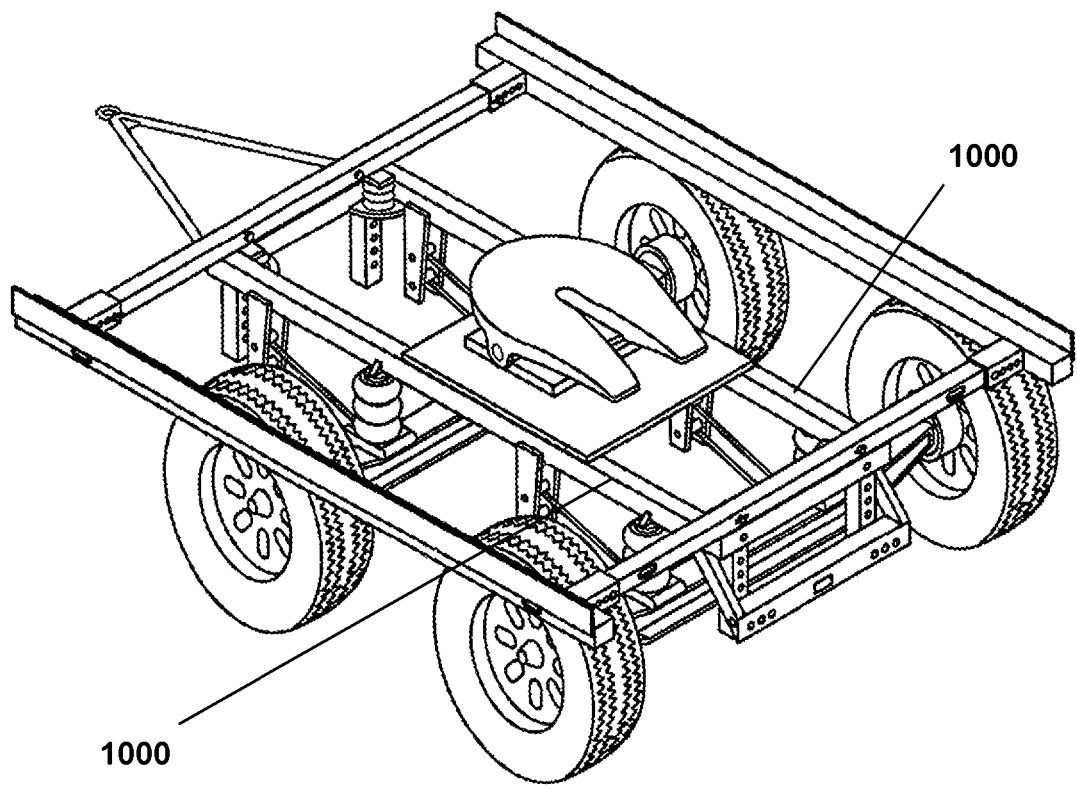
FIG. 10 shows a trailer of a prior art or known type, having a turntable mounted on or above two parallel beams that extend rearwards from the turntable, generally in parallel with the direction of travel
Figure 11:
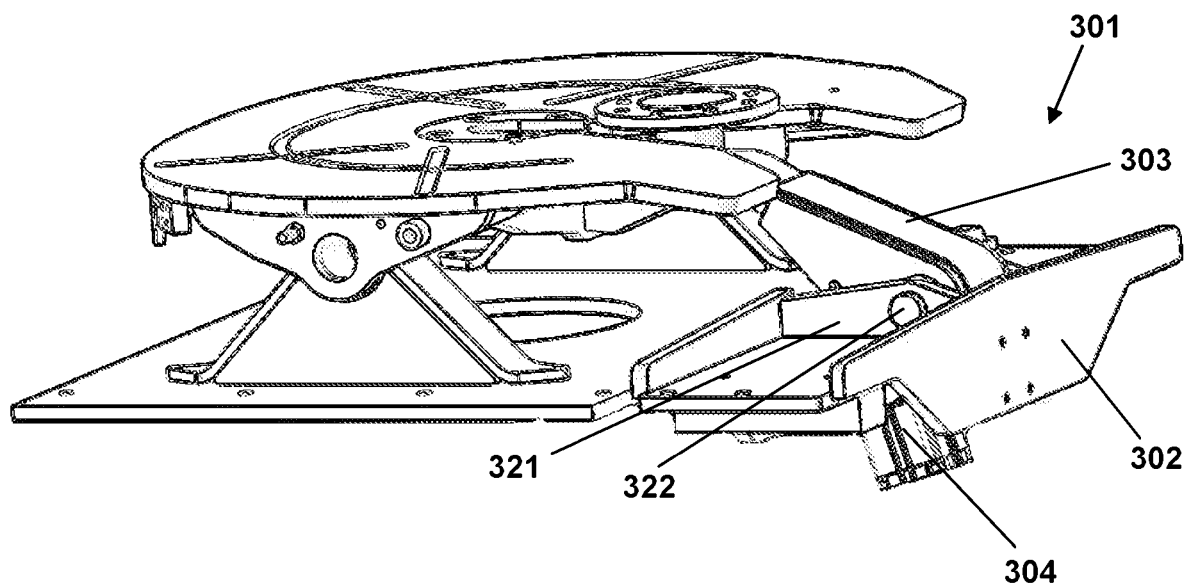
FIG. 11 shows a perspective view from the side and slightly to the rear of a fourth embodiment of the device for preventing a trailer pin from disengaging from a turntable of the present invention, the device of the fourth embodiment having a base formed as an 'H'-beam, configured for connection to a tow unit of the type that includes a turntable, a pin capture arm connected to the base above the base, and a piston arranged to move the pin capture arm from a first lower position close to the base and a second position further away or raised from the base, in the first position a trailer pin being able to freely slide in and out of a turntable without interference from the connected device, and in the second position the pin capture plate preventing the trailer pin from rolling backwards off the turntable, the device shown located behind a turntable as it would be in use, with a trailer kingpin also shown in the jaws of the turntable, the arm of the device shown raised.
Figure 12:
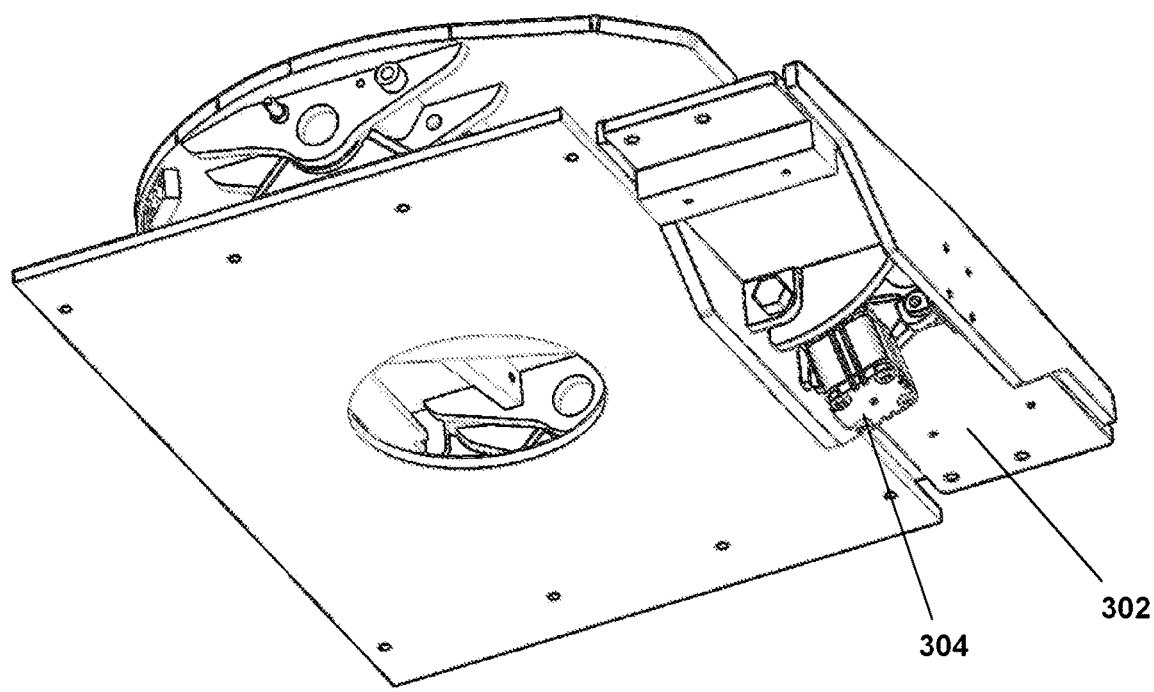
FIG. 12 shows a perspective view from underneath of the device and turntable of FIG. 11, showing detail of the piston mounted to the base beam.
Figure 13:
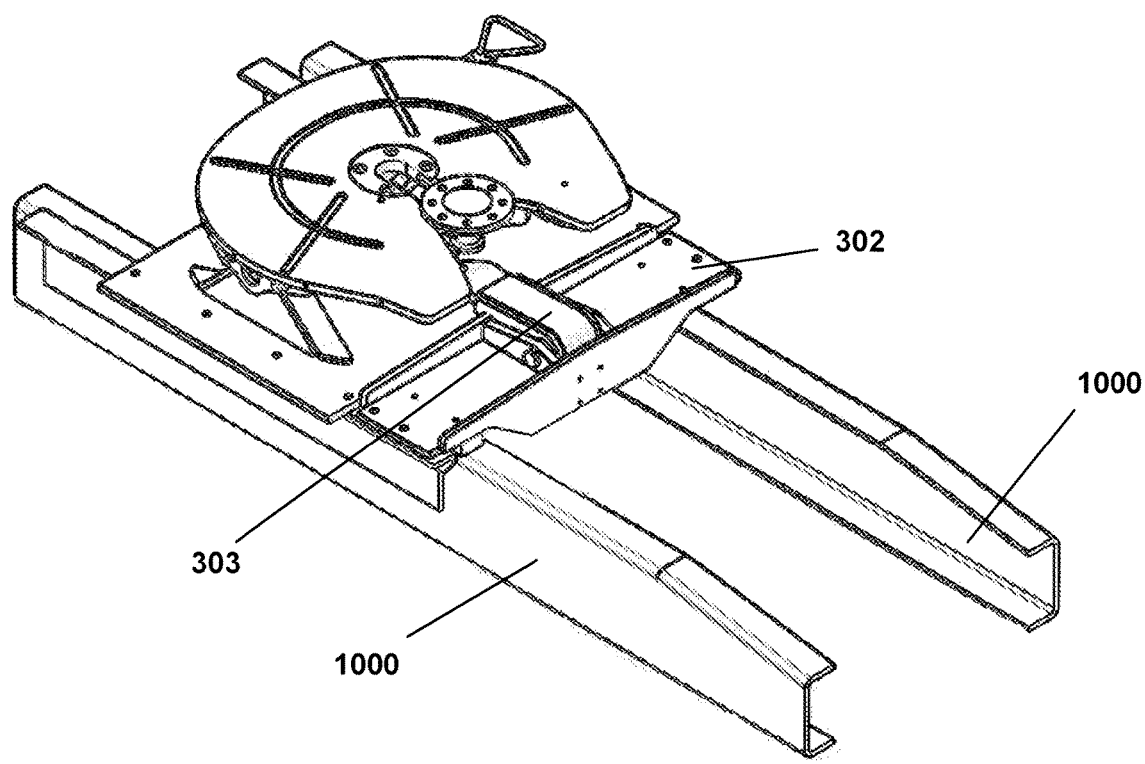
FIG. 13 shows detail of the device of FIGS. 11 and 12 mounted to a pair of parallel beams that form part of the trailer of FIG. 11, the turntable assembly also shown mounted on the beams in front of the device, a kingpin shown located between the jaws of the turntable, the arm shown in the first or lowered position so that the kingpin can move freely in and out of the jaws of the turntable.

The mounting base of this embodiment comprises an elongate beam member with an 'H' profile when viewed end-on, that is intended for mounting in use ideally between the two outrigger arms that extend in parallel rearwards from the turntable on a typical tow unit—see for example the arms 1000 on the tow unit shown in FIG. 10. The mounting base 302 is mounted on the top of the arms 1000, extending perpendicularly between them, as shown in FIG. 13. The mounting base is formed so that the lower mid-section of the arms of the 'H' on the H-beam extends further downwards than the arms at the end, with an angled slope between the central section and the thinner end sections. This assists with locating the base 302 in position and also with holding it in the correct location behind the turntable, as shown in FIGS. 11 and 12.

The flat horizontal central part of the 'H' has a number of apertures 320 formed at each end of the body 302 that are used to mount the body 302 to the arms 1000 via rivets, bolts or similar.

An aperture is formed in the centre of the body 302, between the arms of the 'H'. Upstanding mounting plates 321 extend substantially vertically upwards and downwards at the two sides of the aperture towards the ends of the body 302. Pivot apertures are formed one each in those parts of each of the mounting plates 321 that extend above the central part or crossbar of the 'H', the pivot apertures formed towards the rear of the body 302, the pivot apertures having a common axis. Mounting apertures are formed in those parts that extend below the central part.

The capture arm 303 has the form of an elongate member—viewed from the side, the capture arm 303 appears as a generally straight body, with a flat top and vertical side walls that extend downwards from the flat top, the side wall having pivot apertures formed therein. The outer or rear end of arm 303 is pivotally connected to the upper surface of the mounting body 302 via the pivot apertures in the upstanding mounting plates 321 and the side walls, a pin 322 extending through the pivot apertures to form an axis of rotation substantially parallel with the elongate axis of the base 302 and perpendicular to the axes of the beams 1000. The front end of the capture arm 303 is angled or bent slightly downwards, so that when the main rear portion of the arm 303 is pivoted/raised/angled upwards, the front end will be horizontal.

The outer or open front end of the arm 303 has a recess or slot 308 formed in it, having generally straight sides and a curved inner base end when viewed in plan view. The width of the slot 308 is substantially the same as a trailer kingpin (e.g. the 102-or-103 and 103.5-inch (50.8 or 77 mm 88.9 mm) diameter steel pin that extends downwards from the underside at the front end of a semi-trailer) so that a trailer pin will fit closely inside the slot 308. The slot is sized to fit a specific diameter of pin. However, different sizes of arm can be manufactured for use with the different sizes of pin used in different types of trailers. In use, the pin slides into the open outer or front end of the slot 308.

As shown in the figures, a typical set of turntable jaws will have a wide outer mouth that funnels down to a narrower inner section with parallel walls. The base 302 is connected to the tow unit so that the slot 308 is slightly behind the opening of the narrower inner section jaws of the turntable, and within the 'V' of the wide outer mouth.

The piston 304 forms a movement mechanism between the base 302 and the arm 303. The piston 304 is mounted to the underside of the body 302 via the mounting apertures in the mounting plate 321, and is connected to the arm 303 so that as the piston operates, it will cause the arm 303 to rotate upwards and downwards around the pivot axis 312. The piston 302 is in the preferred embodiment connected to or plumbed into the supply tank of the truck or prime mover so that it is powered independently of any other systems and runs solely on air from the supply of the truck.

Figure 15:
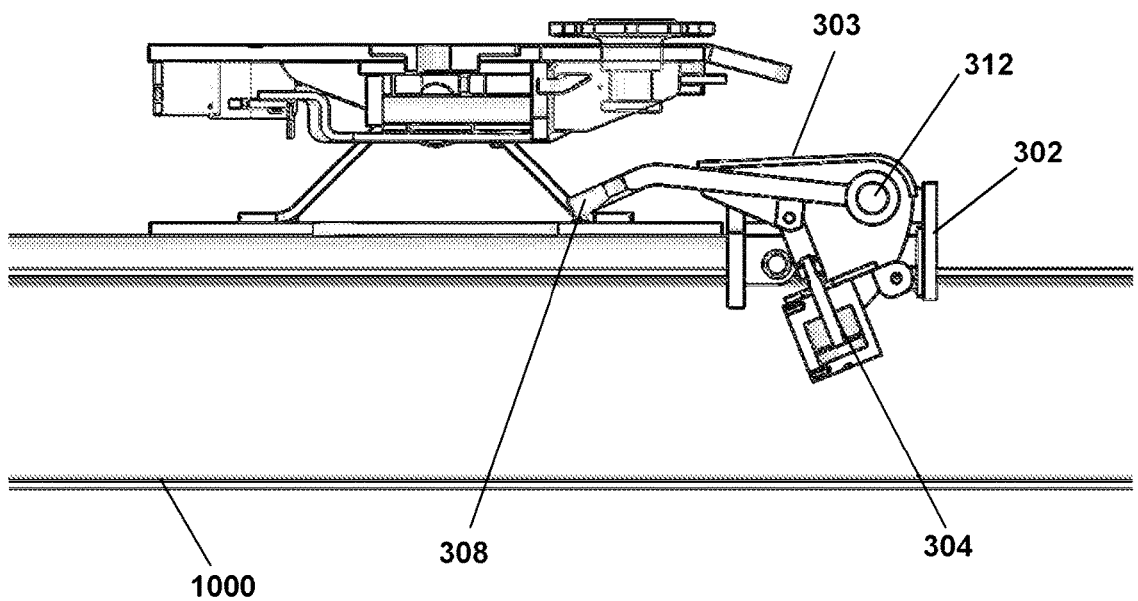
FIG. 15 shows a cutaway side view of the device, turntable, kingpin and mounting rails of FIGS. 11 to 14, showing detail of the piston and arm mounted to the base, the arm shown in the first or lowered position.

In use, the device 301 is clamped to the turntable beams 1000 behind the turntable, as shown in the figures and as described above. As shown in FIGS. 13 and 15, the arm 303 is in it's default downwards or first position so that the kingpin on a trailer can slide in and out of the turntable, allowing the trailer to be connected or disconnected without interference. The kingpin is moved into position in the jaws of the turntable, the kingpin moving over the top of the lowered arm 303 in the first position.

Figure 14:
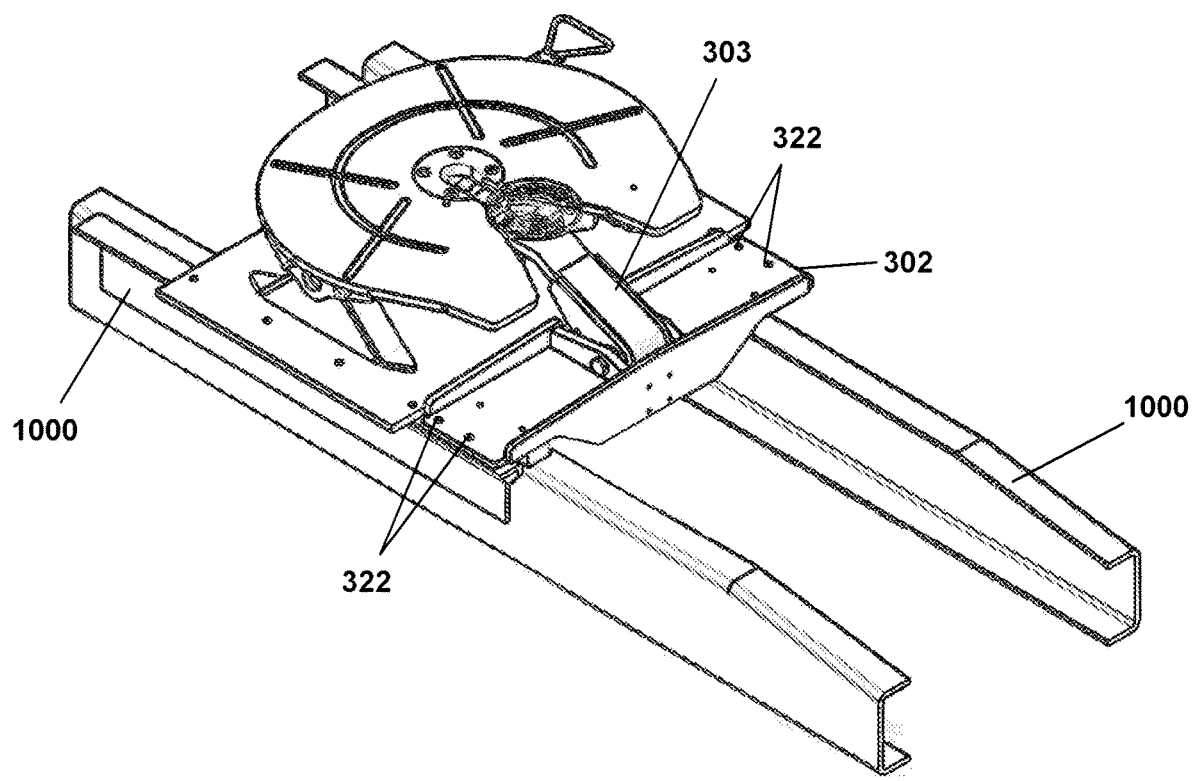
FIG. 14 shows the same view as FIG. 13, except with the arm raised so that the pin will be captured by the arm of the device if it moves backwards out of the turntable jaws.
Figure 16:
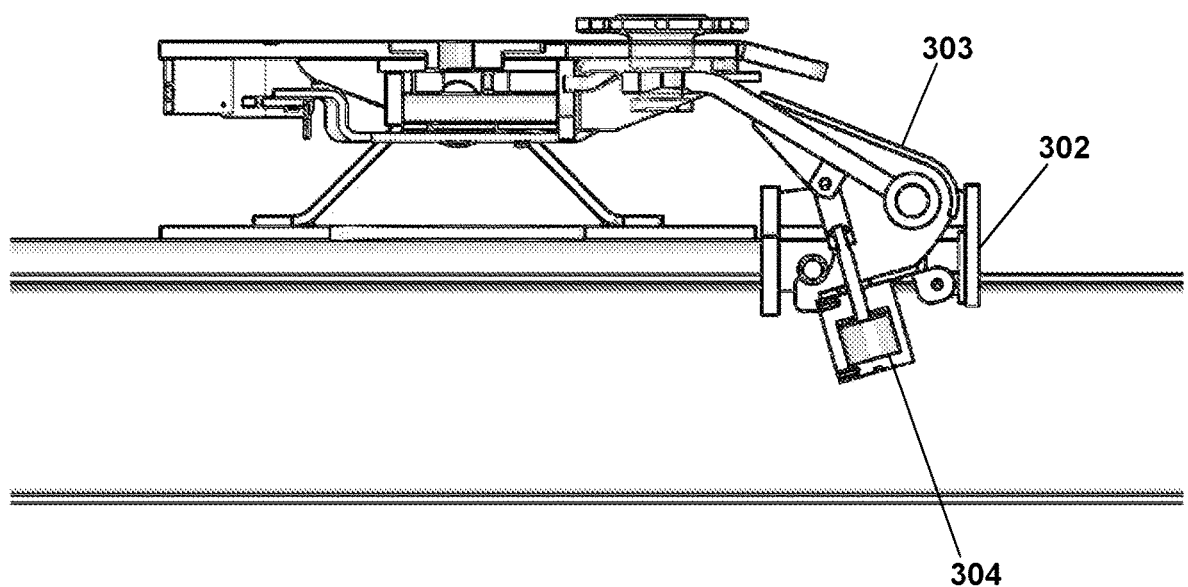
FIG. 16 shows the same view as FIG. 15, except with the arm raised.
Figure 17:
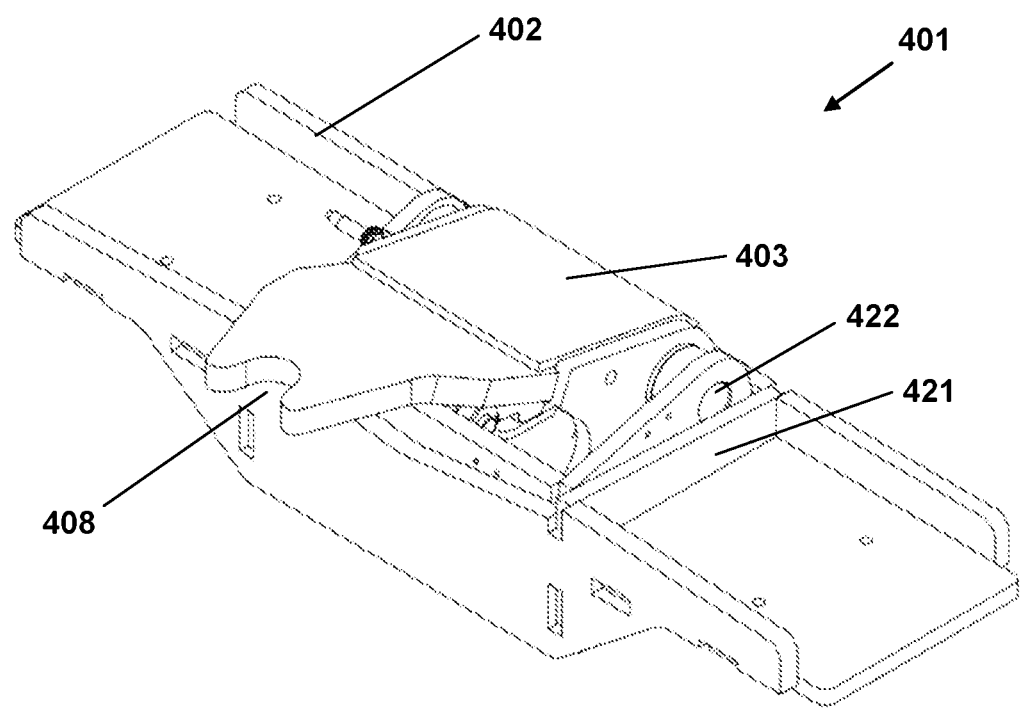
FIG. 17 shows a perspective view from the side and above and looking rearwards of a fourth embodiment of the device for preventing a trailer pin from disengaging from a turntable of the present invention, the device of this embodiment similar to that shown in FIGS. 11 to 16, but using an airbag to move the pin capture arm between the first and second positions, the air bag inflated so that the capture arm is raised towards the second position.
Figure 18:
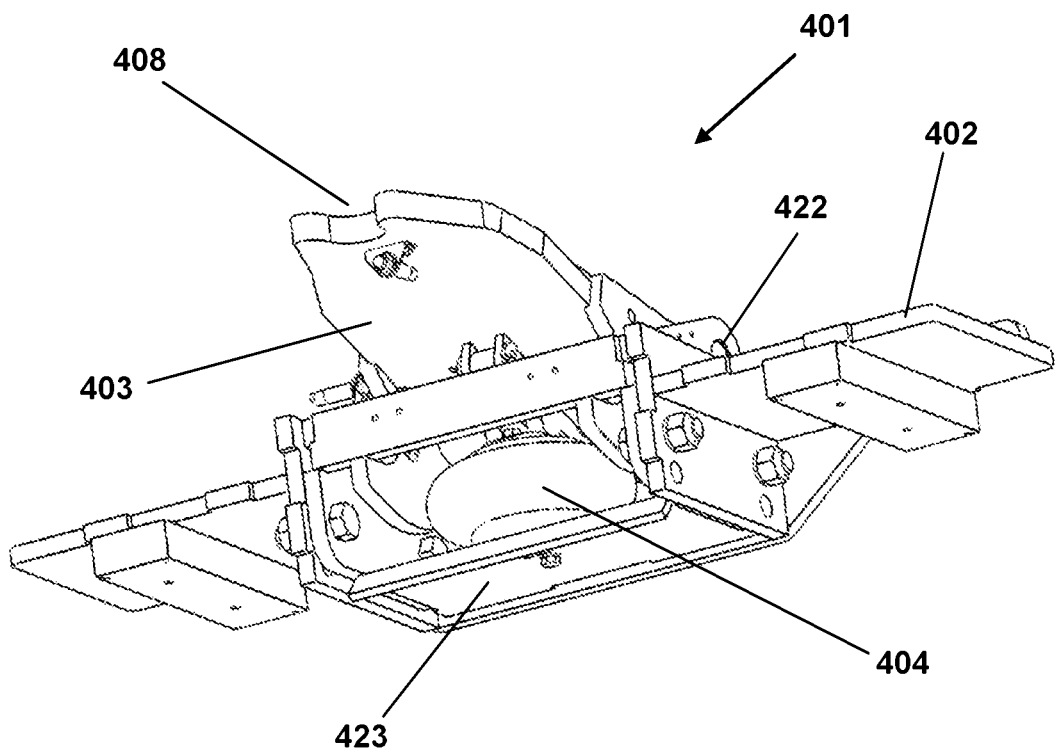
FIG. 18 shows the device of FIG. 17 from the side and underneath and looking rearwards.
Figure 19:
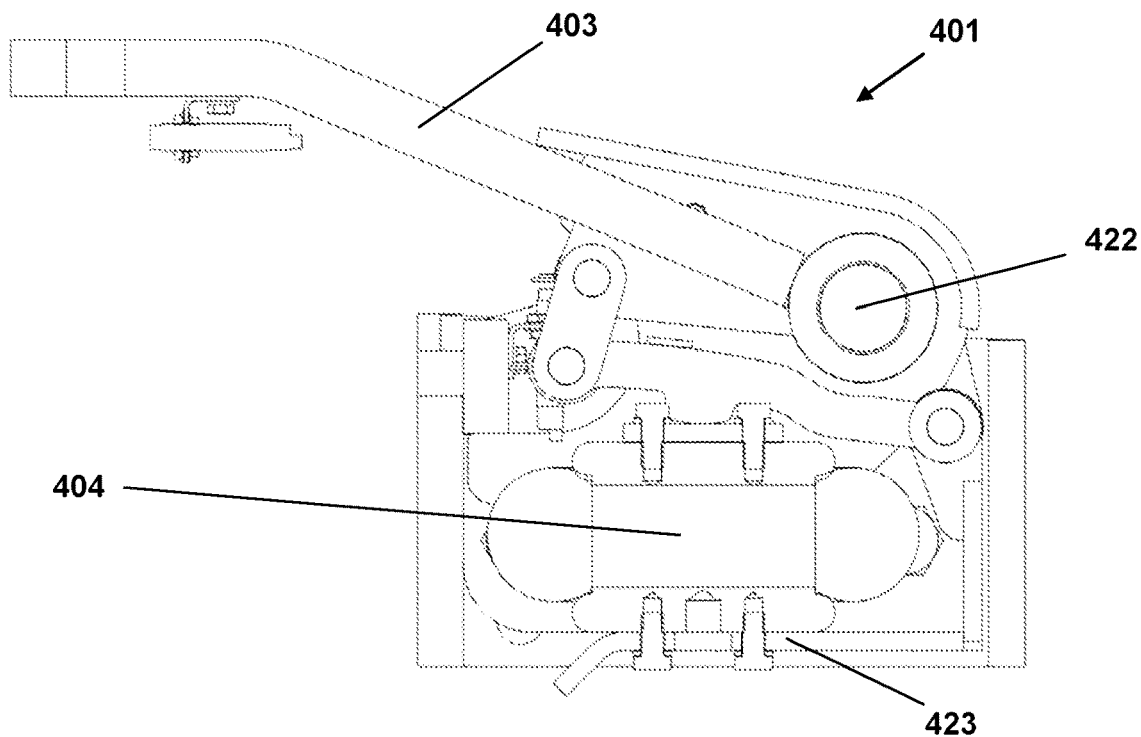
FIG. 19 shows a perspective view from the side and above and looking rearwards of a variation of the device of FIGS. 17 and 18, with the airbag deflated so that the capture arm is in the lowered or first position, the capture arm in this variation having a wider or flared lower section at the opposite end from the pin capture end.
Figure 20:
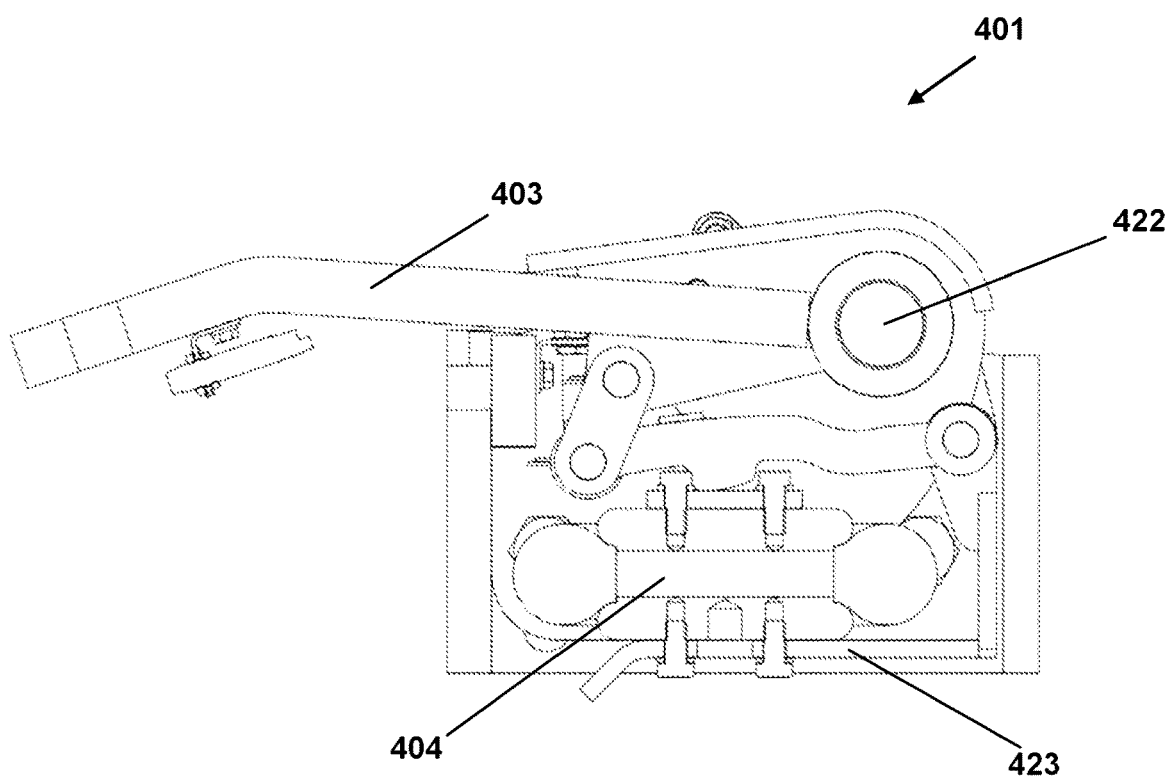
FIG. 20 shows the device of FIG. 19 from the side and underneath and looking rearwards.

Once the kingpin is located in the turntable, the operator activates the device 301 so that the piston 304 operates to move the arm 303 so that this raises up from the first position to the second position, the arm 303 shown in this raised position in FIGS. 14 and 16. The arm of the device 301 is now sitting between the jaws of the turntable, slightly below the turntable. The slot 308 is directly behind the body of the kingpin. If during use the turntable jaws fail and open, the pin will slide rearwards out of the turntable but the trailer will be prevented from detaching from the tow unit as the pin will slide into the slot 308. With the arm 303 connected to the mounting base 302, which is connected to the towing unit, the trailer will thus be prevented from moving further rearwards and is prevented from fully detaching or rolling backwards off the turntable. That is, the slot 308 is shaped so that in the second position if the trailer pin slides rearwards, the recess or slot 308 will engage with the trailer pin to prevent the pin from rolling backwards off the turntable.

When the driver wishes to release the capture device they can do so by operating the piston so that the arm 303 rotates downwards towards from the second position to the first position. The trailer can then be removed from the turntable in the normal manner.

The length of the slot 308 allows full capture of the pin (i.e. the slot is at least as long as the diameter of the pin). This allows control to be maintained, so the driver of the tow unit can gently apply the brakes of the prime mover so the trailer is allowed to move forward and subsequently be locked back into the turntable, so control can be maintained.

One advantage of the fourth embodiment described above is that as the mounting plate is bolted to the angle outriggers on the chassis, it has no more contact with the 5th wheel and it is completely self supported.

A fifth embodiment of the device for preventing a trailer pin from disengaging from a turntable is shown in FIGS. 17 to 20. The device of this embodiment is similar to the device of the fourth embodiment, but uses an air bag instead of a hydraulic piston.

The device 401 has four main parts: a mounting base or bottom plate 402, a capture arm 403, and an air bag 404.

As for the fourth embodiment, the mounting base 402 is used to connect the device 401 to a tow unit, and to act a base and mounting platform for the capture arm 403 and air bag 404. As described for the fourth embodiment, the device 401 is intended for use with tow units of the type that have an integral turntable, but in the specification where reference is made to a 'tow unit', 'tow vehicle', or similar, this should be taken as meaning a truck, tractor or other powered prime mover, or the lead AB combination trailer, or a dolly, or any other towing device that uses a turntable.

The mounting base of this embodiment comprises an elongate beam member with an 'H' profile when viewed end-on or side-on, that is intended for mounting in use ideally between the two outrigger arms that extend in parallel rearwards from the turntable on a typical tow unit—see for example the arms 1000 on the tow unit shown in FIG. 9. The mounting base 402 is mounted on the top of the arms 1000, extending perpendicularly between them. The mounting base is formed so that the lower mid-section of the arms of the 'H' on the H-beam extends further downwards than the arms at the end, with an angled slope between the central section and the thinner end sections. This assists with locating the base 402 in position and also with holding it in the correct location.

The flat horizontal central part of the 'H' has a number of apertures (not shown) formed at each end of the body 402 that are used to mount the body 402 to the arms 1000 (or similar) via rivets, bolts or similar.

An aperture is formed in the centre of the body 402, between the arms of the 'H'. An upstanding mounting flange 421 extends substantially vertically upwards at each side of the aperture. A pivot point is formed in each of the mounting flanges 421 towards the rear of the body 402, the pivot points having a common axis that extends across the aperture in parallel with the main axis of the body 402.

The capture arm 403 has the form of an elongate member—viewed from the side, the capture arm 403 appears as a generally straight body, with a flat top and vertical side walls that extend downwards from the flat top, the outer or rear end of the side walls of the arm 403 adapted to pivotally connect to the mounting body 402 via the pivot points in the mounting flanges plates 421. A rotation pin 422 or similar extends between the pivot points and through the side walls of the arm to form an axis of rotation substantially parallel with the elongate axis of the base 402 and perpendicular to the axes of the beams 1000. The front end of the capture arm 403 is angled or bent slightly downwards, so that when the main rear portion of the arm 403 is pivoted/raised/angled upwards, the front end will be horizontal. In plan view, the arm 403 is wider at it's base, the arm 403 appearing roughly triangular in plan view.

The outer or open front end of the arm 403 has a recess or slot 408 formed in it, at the apex of the triangle. The slot 408 has inwardly curving sides and a curved inner base end when viewed in plan view. The width of the slot 408 is substantially the same as a trailer kingpin (e.g. the 102-or-103 and 103.5-inch (50.8 or 77 mm 88.9 mm) diameter steel pin that extends downwards from the underside at the front end of a semi-trailer) so that a trailer pin will fit closely inside the slot 408. The slot is sized to fit a specific diameter of pin. However, different sizes of arm can be manufactured for use with the different sizes of pin used in different types of trailers. In use, the pin slides into the open outer or front end of the slot 408.

As for previous embodiments, the base 402 is connected to the tow unit so that the slot 408 is slightly behind the opening of the narrower inner section jaws of the turntable, and within the 'V' of the wide outer mouth.

The air bag 404 forms a movement mechanism between the base 402 and the arm 403. The air bag 404 is mounted to the underside of the body 402 via a mounting platform 423 that extends under, and which is connected to, the mounting plate 402. The air bag 404 is mounted on top of the mounting platform 423 and is connected to the underside of the arm 403 so that as it is inflated and deflated, it will cause the arm 403 to rotate upwards and downwards around the pivot axis formed by the pin 422. The air bag 404 is in the preferred embodiment connected to or plumbed into the supply tank of the truck or prime mover so that it is powered independently of any other systems and runs solely on air from the supply of the truck.

In use, the device 401 is clamped to the turntable beams 1000 behind the turntable. The arm 403 has a default downwards or first position so that a kingpin on a trailer can slide in and out of the turntable, allowing the trailer to be connected or disconnected to a prime mover or similar without interference. The kingpin is moved into position in the jaws of the turntable, the kingpin moving over the top of the lowered arm 403 in the first position.

Once the kingpin is located in the turntable, the operator activates the device 401 so that the air bag 404 operates to move the arm 403 so that this raises up from the first position to the second position. The arm of the device 401 is now sitting between the jaws of the turntable, slightly below the turntable. The slot 408 is directly behind the body of the kingpin. If during use the turntable jaws fail and open, the pin will slide rearwards out of the turntable but the trailer will be prevented from detaching from the tow unit as the pin will slide into the slot 408. With the arm 403 connected to the mounting base 402, which is connected to the towing unit, the trailer will thus be prevented from moving further rearwards and is prevented from fully detaching or rolling backwards off the turntable. That is, the slot 408 is shaped so that in the second position if the trailer pin slides rearwards, the recess or slot 408 will engage with the trailer pin to prevent the pin from rolling backwards off the turntable.

When the driver wishes to release the capture device they can do so by operating the air bag 404 so that the arm 403 rotates downwards towards from the second position to the first position. The trailer can then be removed from the turntable in the normal manner.

The length of the slot 408 allows full capture of the pin (i.e. the slot is at least as long as the diameter of the pin). This allows control to be maintained, so the driver of the tow unit can gently apply the brakes of the prime mover so the trailer is allowed to move forward and subsequently be locked back into the turntable, so control can be maintained.

One advantage of the fifth embodiment described above is that as the mounting plate is bolted to the angle outriggers on the chassis, it has no more contact with the 5th wheel and it is completely self supported.

For all the embodiments described above, an automated alarm system can also be fitted. When the kingpin hits the capture arm during an inadvertent release, an automated warning is generated that sends a message to an authorised person. In the preferred form this is via a txt message. That is, the automated alarm system automatically generates and sends a txt message when the kingpin hits the capture arm during an inadvertent release.

In the embodiments described above, the devices are described as additional elements, connecting to an existing separate tow unit. It should be noted that the devices could be modified or configured for integral connection to the tow unit—that is, the device could be an integral part of the tow unit. It should also be noted that the devices are described as connected behind the turntable. This should be taken to mean that at least a part of the device is active in use behind the turntable, and separate to any integral lock or safety mechanism that forms part of the turntable.

It will be understood that the components shown in any of the drawings are not necessarily drawn to scale, and, like parts shown in several drawings may be designated the same reference numerals.

The invention is not limited to the embodiments hereinbefore described which may be varied in both construction and detail.

The invention claimed is:

1. A device configured to prevent a trailer pin from disengaging from a turntable, comprising:
    a mounting base, configured to connect to a tow unit that includes the turntable, behind the turntable;
    a pin capture mechanism connected to the base, the base and pin capture mechanism configured so that at least part of the pin capture mechanism can move between first and second positions relative to the base, and so that in the first position a trailer pin can freely slide into the turntable, and in the second position the pin capture mechanism will prevent the trailer pin detaching from the turntable;
    an air bag, located so that inflation of the air bag moves and retains the pin capture mechanism in the second position.

2. The device of claim 1 further comprising a hydraulic power pack configured to inflate the air bag.

3. The device of claim 1 wherein the air bag is formed from a robust flexible material.

4. The device of claim 3 wherein the air bag is in use independently fluidically connected to or plumbed into a supply from a prime mover.

5. The device of claim 3 wherein the air bag has a pre-set required pressure of substantially 20 PSI.

6. The device of claim 1 further comprising an automated alarm system configured to send an automated message wirelessly or telephonically when the trailer pin hits the arm during an inadvertent release.

7. The device of claim 6 wherein the automated message is sent via a text message.

8. The device of claim 1 wherein the pin capture mechanism comprises a member shaped to engage with the trailer pin in the second position to prevent the pin from rearwards movement off the turntable.

9. The device of claim 8 wherein the member comprises an arm having a recess or slot formed at a front end, an outer or rear end of the arm configured for pivotal connection to the mounting base, the arm rotating upwards from the first position to the second position.

10. The device of claim 9 wherein the recess or slot is sized to allow full capture of the pin.

11. The device of claim 10 wherein the recess or slot has a substantially semi-circular inner shape.

12. The device of claim 11 wherein the arm comprises first and second parts connected at an angle such that in the second position the second part is raised above and aligned substantially parallel to an upper surface of the base, and the first part extends from the second part downwards and rearwards towards the base.

13. The device of claim 12 wherein the arm is pivotally connected to the base at or close to the free end of the first part.

14. The device of claim 10 wherein the arm comprises first and second parts connected at an angle such that in the second position the second part is raised above and aligned substantially parallel to an upper surface of the base, and the first part extends from the second part downwards and rearwards towards the base.

15. The device of claim 14 wherein the arm is pivotally connected to the base at or close to the free end of the first part.

16. The device of claim 9 wherein the recess or slot has a substantially semi-circular inner shape.

17. The device of claim 16 wherein the arm comprises first and second parts connected at an angle such that in the second position the second part is raised above and aligned substantially parallel to an upper surface of the base, and the first part extends from the second part downwards and rearwards towards the base.

18. The device of claim 17 wherein the arm is pivotally connected to the base at or close to the free end of the first part.

19. The device of claim 9 wherein the arm comprises first and second parts connected at an angle such that in the second position the second part is raised above and aligned substantially parallel to an upper surface of the base, and the first part extends from the second part downwards and rearwards towards the base.

20. The device of claim 19 wherein the arm is pivotally connected to the base at or close to the free end of the first part.

21. The device of claim 1 wherein the air bag has a pre-set required pressure of substantially 20 PSI.

* * * * *